[11] 3,581,824

[72] Inventor Billy G. Hurd
  Dallas, Tex.
[21] Appl. No. 885,793
[22] Filed Dec. 17, 1969
[45] Patented June 1, 1971
[73] Assignee Mobil Oil Corporation

[54] OIL RECOVERY PROCESS USING AN IONIC POLYSACCHARIDE THICKENING AGENT
  14 Claims, 1 Drawing Fig.
[52] U.S. Cl. ............................................. 166/270,
  166/246, 166/273
[51] Int. Cl. .......................................... E21b 43/22
[50] Field of Search .................................. 166/273,
  274, 246, 270

[56] References Cited
  UNITED STATES PATENTS

| | | | |
|---|---|---|---|
| 3,175,610 | 3/1965 | Osoba | 166/270 |
| 3,208,518 | 9/1965 | Patton | 166/246 |
| 3,289,759 | 12/1966 | Fisher | 166/270 |
| 3,396,790 | 8/1968 | Eaton | 166/270 |
| 3,469,630 | 9/1969 | Hurd et al. | 166/273X |
| 3,474,864 | 10/1969 | Hurd | 166/273X |
| 3,477,508 | 11/1969 | Hurd | 166/273X |
| 3,502,146 | 3/1970 | Hurd | 166/273X |

*Primary Examiner*—Stephen J. Novosad
*Attorneys*—William J. Scherback, Frederick E. Dumoulin, William D. Jackson, Andrew L. Gaboriault and Sidney A. Johnson

ABSTRACT: This specification discloses an oil recovery process involving the injection of an aqueous liquid containing an ionic polysaccharide thickening agent which is subject to agglomeration in the presence of divalent cations. This liquid, which exhibits a relatively low divalent cation concentration, is preceded by an aqueous liquid having a relatively high divalent cation concentration. As the first injected liquid moves through the reservoir, divalent cations are adsorbed onto the reservoir surfaces. These cations then are desorbed from the reservoir surfaces into the liquid containing the thickening agent in order to cause agglomeration thereof. This agglomeration results in partial plugging of the reservoir preferentially within the more permeable zones thereof in order to improve the sweep efficiency of the recovery process.

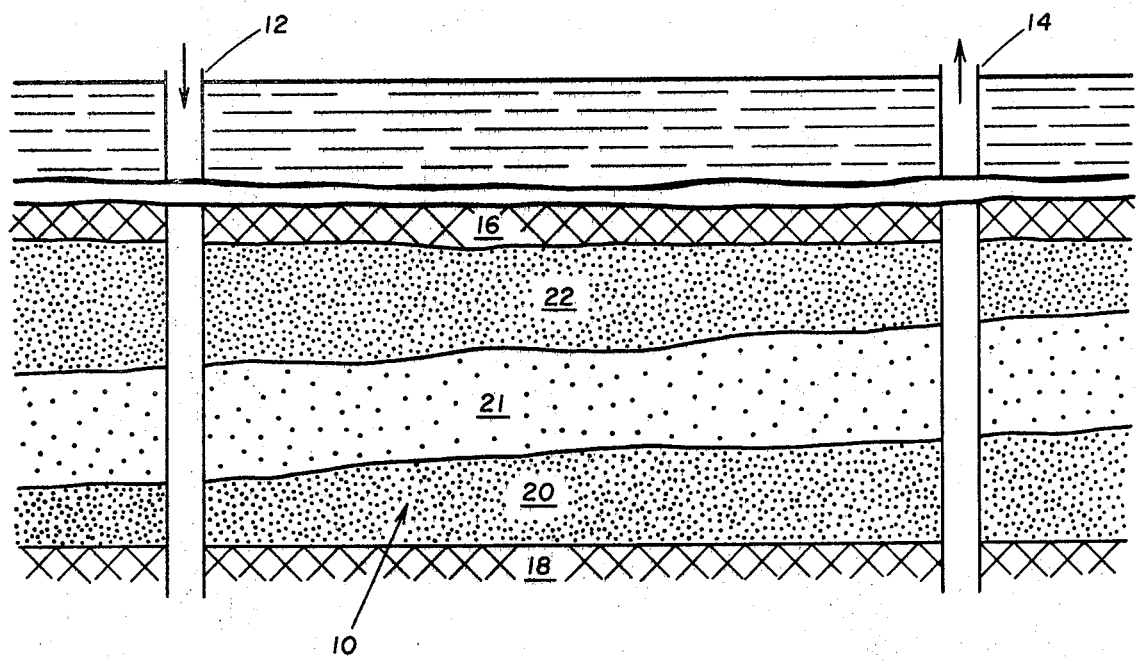
BILLY G. HURD
INVENTOR
BY *William R. Jackson*
ATTORNEY 3,581,824

OIL RECOVERY PROCESS USING AN IONIC POLYSACCHARIDE THICKENING AGENT

This application is a continuation-in-part of application Serial No. 692,819, filed Dec. 22, 1967, now U.S. Pat. No. 3,502,146.

BACKGROUND OF THE INVENTION

This invention relates to recovery of oil from subterranean oil reservoirs and more particularly to new and improved secondary recovery processes employing aqueous flooding mediums.

In the recovery of oil from oil-bearing formations it is usually possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In these supplemental techniques which are commonly referred to as "secondary recovery operations," although in fact they may be primary or tertiary in sequence of employment, fluid is introduced into the reservoir in order to displace the oil therein to a suitable production system through which the oil may be withdrawn to the surface of the earth. Generally, the most promising of the secondary recovery techniques are the waterflooding processes which involve the injection of an aqueous flooding medium such as fresh water or brine. The aqueous flooding medium may be injected either alone or in combination with other fluids such as a gas, an oil-miscible liquid such as butane, or an oil- and water-miscible liquid such as an alcohol.

One difficulty which often is encountered in secondary recovery operations is the relatively poor sweep efficiency of the injected displacing liquid, that is, the tendency of the displacing liquid to channel through certain portions of the reservoir and to bypass other portions. Such poor sweep efficiency is occasioned by differences between the viscosity of the injected displacing medium and in situ reservoir oil and also by permeability variations within the reservoir. The reservoir may comprise a plurality of fairly well defined zones of widely diverse permeabilities. The injected displacing fluid preferentially flows through the more permeable zones of the reservoir thus leading to premature breakthrough of the displacing fluid at the production well or wells.

Even when the reservoir exhibits a relatively uniform permeability throughout, a situation referred to as instability fingering may develop in those instances where the viscosity of the injected displacing fluid is significantly less than the viscosity of the in situ reservoir oil. In this situation, the less viscous displacing fluid tends to develop fingers or bulges which may be caused by points of minute heterogeneities in the reservoir. These fingers of displacing fluid tend to become extended in the direction of flow and travel at a faster rate than the remainder of the injected fluid, thus again resulting in premature breakthrough at the production system.

Various techniques have been proposed in order to improve the sweep efficiency of the injected displacing fluid and thus avoid premature breakthrough. For example, it has been proposed in waterflooding operations to add thickening agents to at least a portion of the aqueous flooding medium in order to increase the viscosity thereof. The viscosity of the flooding medium may be increased prior to its injection into the reservoir or alternatively the viscosity may be increased in situ in order to avoid a reduction in injectivity at the injection well. For example, in U.S. Pat. No. 3,208,518 to Patton there is disclosed a waterflooding process wherein the viscosity of the flooding medium is increased in situ through the use of high molecular weight polymers such as ionic polysaccharides produced by the fermentation of carbohydrates by bacteria of the genus Xanthomonas, under controlled pH conditions.

Various other techniques of improving sweep efficiency involve the selective formation of plugging agents within the more permeable zones of the reservoir. For example, U.S. patent application Ser. No. 783,370, filed Dec. 12, 1968, by Milton K. Abdo, now U.S. Pat., No 3,522,844 discloses a waterflooding process which employs a thickening agent which precipitates in the presence of divalent cations to form a plugging deposit in the reservoir. A chelating agent is injected in this process in order to control the formation of the plugging agent such that it is selectively precipitated at zones of crossflow between strata of diverse permeabilities. In the Abdo process the thickening agent may be preceded by an aqueous solution of an alkali metal salt in order to effect an ion exchange reaction between the alkali metal ions and the divalent metal ions associated with the reservoir, thus placing the divalent metal ions in aqueous solution. Various other techniques for selectively plugging zones of an oil reservoir are known. For example, U.S. Pat. No. 3,396,790 to Eaton discloses a process wherein reactants are successively injected in a reservoir in order to produce an insoluble precipitate.

SUMMARY OF THE INVENTION

In accordance with the present invention, there is provided a new and improved oil recovery process wherein an ionic polysaccharide thickening agent is utilized under conditions such that it is agglomerated within the reservoir to produce various degrees of plugging or relatively high permeability zones. The invention is carried out in a subterranean oil reservoir which exhibits a base exchange capacity and is penetrated by spaced injection and production systems defining a recovery zone within the reservoir. In practicing the invention, there is first introduced into the reservoir through the injection system an aqueous liquid containing divalent cations in a concentration greater than the divalent cation concentration of the formation water within the reservoir. The divalent cations are absorbed onto the reservoir surfaces in a base exchange mechanism in order to satisfy negative surface charges. Thereafter, an aqueous liquid containing an ionic polysaccharide thickening agent, which is subject to agglomeration in the presence of the divalent cations, is injected. This liquid exhibits a divalent cation concentration which is lower than the divalent cation concentration of the previously injected liquid. These liquids are moved through the reservoir by the injection of a suitable driving fluid and oil is recovered from the production system. As the liquid containing the thickening agent is moved through the reservoir in the direction of the production system, the previously injected divalent cations are desorbed from the reservoir surfaces into solution where they are available to produce agglomeration of the ionic polysaccharide with resultant partial plugging of the reservoir. This plugging occurs primarily in the more permeable zones with the result that the sweep efficiency of the process is enhanced.

In a preferred embodiment of the invention the first injected liquid exhibits a monovalent cation concentration which is lower than the monovalent cation concentration of the formation water, and the liquid containing the thickening agent exhibits a monovalent cation concentration which is greater than that of the first injected liquid. Thus, the exchange of divalent cations between the formation surfaces and the injected water is enhanced to promote the agglomeration of the ionic polysaccharide. In a further preferred embodiment of the invention, a buffer liquid is injected intermediate the first injected liquid and the liquid is injected intermediate the first injected liquid and the liquid containing the ionic polysaccharide. This buffer liquid exhibits a divalent cation concentration less than that of the first injected liquid in order to prevent premature agglomeration of the polysaccharide adjacent the injection system.

BRIEF DESCRIPTION OF THE DRAWING

The drawing is a vertical section of an oil reservoir taken between injection and production wells showing exemplary permeability variations within the reservoir.

DESCRIPTION OF SPECIFIC EMBODIMENTS

It is well known that a great many petroleum reservoir formations exhibit a base exchange capacity by reason of the silica and silicate minerals contained therein which adsorb cations from solution to satisfy negative surface charges. As recognized, for example, in U.S. Pat. No. 3,175,610 to Osoba, monovalent and divalent cations are readily exchangeable by a base exchange mechanism that is largely governed by the laws of mass action. Thus, if a solution of monovalent and divalent cations is equilibrated with a reservoir formation, the formation adsorbs some of the exchangeable cations in accordance with the reaction:

$$D^{++} + M_2 aFo \rightleftarrows 2M^+ + DFo \qquad (1)$$

wherein:
$Fo$ designates the negatively charged formation material,
$M$ designates the monovalent cations, and
$D$ designates the divalent cations.
Since this equilibrium generally follows the law of mass action, the following relationship applies:

$$K = \frac{(M^+)^2(DFo)}{(D^{++})(M_2Fo)} \qquad (2)$$

wherein:
$K$ is the equilibrium constant.

In the present invention this relationship is utilized to advantage in waterflooding processes employing an ionic polysaccharide as a thickening agent to cause a selective permeability reduction in the more permeable zones of a reservoir. The presence of divalent cations in the aqueous solution of polysaccharide causes agglomeration of the polysaccharide which results in a degree of plugging of the reservoir. In the agglomeration reaction a molecular association occurs to form aggregates which may or may not precipitate and settle out of solution, but which tend to filter out and plug small pore spaces. By controlling the divalent cation concentration, and preferably also the univalent cation concentration of the injected fluids, a relatively large amount of divalent cations is made available in the more permeable zones to cause agglomeration of the ionic polysaccharide within these zones. Thus, fluid flow within these high permeability zones is restricted in order to provide for a more uniform advance of the injected floodwater through the reservoir as a whole.

Any suitable ionic polysaccharide which undergoes agglomeration in the presence of divalent cations may be utilized in carrying out the invention. Suitable ionic polysaccharides are the heteropolysaccharides produced by fermentation of carbohydrates by bacteria of the genus Xanthomonas. Exemplary of such heteropolysaccharides are those produced by Xanthomonas campestris, Xanthomonas begonia, Xanthomonas phaseoli, Xanthomonas hederae, Xanthomonas incanae, Xanthomonas carotae, and Xanthomonas translucens. Of these, ionic polysaccharide B-1459 is preferred. The polysaccharide B-1459 is prepared by culturing the bacterium Xanthomonas campestris NRRL B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28° C. Polysaccharide B-1459 is commercially available under the trade name of "Kelzan" from the Kelco Company, San Diego, California.

The concentration of thickening agent employed will depend upon various factors such as the amount which is to be made available for agglomeration and the desired viscosity of the thickened liquid. Typical thickening agent concentrations may be as low as 0.025 to 2 percent by weight. Usually it will be preferred to employ the thickening agent within the range of 0.1 to 0.5 weight percent.

The present invention is carried out in a recovery zone of a subterranean oil-bearing reservoir. As will be understood by those skilled in the art, by the term "recovery zone," as used herein and in the appended claims, is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type of pattern the recovery zone, as defined by the spaced rows of injection and production wells, generally will be that portion of the reservoir underlying the area between these spaced rows. Exemplary of other patterns which may be used is the so-called "circular flood" pattern in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subject to the displacing action of the injected flooding medium. The above and other patterns are well known to those skilled in the art and for a more detailed description of such patterns reference is made to Uren, L. C., Petroleum Production Engineering—Oil Field Exploitation, 2nd Ed., McGraw-Hill Book Company, Inc., New York and London, 1939, and more particularly to the section entitled "The Water Flooding Process," appearing at pages 444—459.

It also will be recognized that the invention may be carried out utilizing one or more dually completed injection-production wells of the type, for example, disclosed in U.S. Pat. No. 2,725,106 to Ralph Spearow. This arrangement sometimes may be utilized to advantage in a relatively thick oil reservoir in which it is desirable to displace the oil in the reservoir upwardly and recover such oil from the upper portion of the reservoir. In this instance, the injection system normally would comprise the lower completion interval of one or more dually completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir.

Turning now to the drawing, there is illustrated an oil reservoir 10 penetrated by spaced injection and production wells 12 and 14, respectively. While, for the purpose of simplicity in describing the invention, only one injection well and one production well are shown, it will be recognized that in practical applications of the invention a plurality of such wells may be, and in most cases will be, utilized. Thus, the wells 12 and 14 may each be considered to be located in rows of spaced injection and production wells, as in the line flood pattern described above. Also, the injection well 12 may be considered to be the central well in a circular flood pattern, e.g., a five-spot or nine-spot pattern, and the production well 14 one of the peripheral wells.

The reservoir 10 is bounded by layers 16 and 18 of relatively impermeable rock which overlie and underlie the reservoir. The reservoir is shown as being comprised of a number of fairly well defined zones 20, 21, and 22 which differ considerably in permeability in the direction of flow from the injection well to the production well. These zones may, of course, slope or have various curvatures, but typically they extend generally parallel to one another as shown. Some of the zones may be discontinuous. Thus, they may terminate or begin at various locations as viewed in the direction of flow. Also, while only vertical permeability variation is shown in the reservoir 10, it will be recognized that the reservoir may exhibit horizontal permeability variation; that is, a horizontal section through the reservoir may reveal zones of diverse permeabilities.

Of the reservoir zones illustrated, those indicated by reference numerals 20 and 22 are considered to be zones of relatively low permeability with the zone 21 being a zone of relatively high permeability. Each of the reservoir zones 20, 21, and 22 contain oil which is desired to be displaced to the production well 14 by injecting a suitable fluid through the injection well 12. It will be recognized that upon injecting a displacing fluid through well 12, the fluid will flow preferentially through the zone 21 of high permeability with the result that relatively rapid displacement occurs therein as compared with the low permeability zones 20 and 22. Thus, the high permeability zone 21 will be "swept out" and the displacing fluid will break through at the production well 14 long before the injected displacing fluid is moved completely through the low permeability zones 20 and 22. Once breakthrough occurs at the production wells, the effectiveness of the secondary recovery process will be seriously restricted and additional oil can be recovered from the relatively low permeability zones 20 and 22 only at an increased expense.

In addition to oil, the reservoir 10 also contains water under conditions such that an equilibrium condition exists between the ions in aqueous solution and the ions present on the reservoir surfaces. This water, referred to as "formation water," may be connate water, i.e. water entrapped within the formation at the time of sedimentary deposition, or it may be extrinsic water such as water introduced into the reservoir by an edgewater drive. In practice many oil reservoirs are produced during the primary recovery phase by mechanisms which involve the encroachment of edgewater, and the formation water within the reservoir typically will include both extrinsic water such as may invade the reservoir by an edgewater drive and also connate water. In any case, the formation water within the reservoir will exist at an equilibrium condition with the reservoir formation in accordance with the above-identified relationship (2).

As a first step in carrying out the invention, an aqueous liquid containing divalent cations is injected into the reservoir 10 through injection well 12. The divalent cation concentration of this liquid is greater than the divalent cation concentration of the formation water within the reservoir. As the injected liquid advances through the reservoir, divalent cations will adsorb from solution onto the reservoir surfaces in order to shift the ion exchange reaction in a direction toward the equilibrium condition defined by relationship (2). Preferably, the first injected liquid exhibits a monovalent cation concentration which is lower than the monovalent cation concentration of the formation water. This will further enhance the displacement of the monovalent ions on the reservoir surface by the injected divalent cations and thus increase the amount of divalent cations adsorbed from solution.

Subsequent to the injection of the first aqueous liquid, an aqueous liquid containing an ionic polysaccharide thickening agent is injected into the reservoir via well 12. The divalent cation concentration of this liquid is less than the divalent cation concentration of the previously injected liquid. The injected liquids will preferentially invade the high permeability zone 21 such that zone 21 will contain both divalent cations and aqueous solution of the thickening agent in greater quantities than zone 20 or zone 22. The aqueous solution of thickening agent is followed by a suitable driving fluid which is introduced through injection well 12 to displace the previously injected fluids through the reservoir in the direction of production well 14. Since the aqueous liquid containing the thickening agent has a lower divalent cation concentration than the initial liquid, the previously deposited divalent cations will be desorbed from the rock surfaces into the solution of thickening agent in order to satisfy the equilibrium conditions defined by relationship (2). Preferably, the subsequent liquid also exhibits a higher monovalent cation concentration than the first injected liquid. This will further enhance the desorption of the divalent cations into the solution containing the ionic polysaccharide.

As the divalent cations go into aqueous solution, the ionic polysaccharide undergoes agglomeration which results in plugging within the reservoir. The degree of agglomeration, and hence the degree of plugging, depends upon the concentration of the divalent cations in solution. Since a relatively large degree of agglomeration occurs within the high permeability zone 21 in comparison with the low permeability zones 20 and 22, the greatest amount of permeability reduction will take place within zone 21. This will tend to force the injected fluids from zone 21 into low permeability zones 20 and 22, thus increasing the sweep efficiency of the waterflood.

It is desirable to introduce a buffer fluid between the first injected fluid and the slug of thickening agent in order to guard against premature agglomeration of the thickening agent immediately adjacent the injection well 12. Thus, in a preferred embodiment of the invention there is injected a buffer liquid which exhibits a lower divalent cation concentration and a higher monovalent cation concentration than the first injected liquid. This will result in desorption of the previously adsorbed divalent cations from the reservoir surfaces immediately adjacent the injection well and displacement of these divalent cations into the reservoir away from the injection well. Thus, near the injection well, the availability of divalent cations for desorption by the subsequently injected liquid containing the ionic polysaccharide will be greatly reduced.

The driving fluid employed may take any suitable form such as gas or alternate slugs of gas and water, although it normally will be an aqueous flooding medium such as fresh water or oil-field brine injected as in conventional waterflooding. Where an aqueous medium is employed as the driving fluid, it may contain various additives such as surfactants and thickening agents. In fact, the driving fluid may comprise an aqueous solution of ionic polysaccharide. Usually, however, it will be desired to limit the amount of polysaccharide injected to the amounts described below in order to avoid excessive plugging of the reservoir 10. Also, for economic reasons, it usually will be desired to employ additives such as surfactants only in the initially injected fluids.

The liquids introduced into the reservoir in accordance with the invention may be injected in any suitable amounts. While these will vary depending upon the characteristics of a given reservoir and the amount of plugging desired within the high permeability zones, the first injected liquid of a high divalent cation concentration preferably will be injected in an amount within the range of 5 to 10 percent of the total pore volume of the recovery zone. The buffer liquid normally should be introduced in an amount within the range of 0.001 to 0.1 percent pore volume of the recovery zone and the aqueous solution of thickening agent in an amount within the range of 1 to 20 percent pore volume of the recovery zone. Thereafter, the driving fluid is injected until the process is carried to completion.

The divalent cations utilized in carrying out the invention normally will be the alkaline earth metal ions with calcium or magnesium ions or mixtures thereof being preferred from the standpoint of ready availability and compatibility with the reservoir. The monovalent ions employed normally will be the alkali metal ions with sodium or potassium or mixtures thereof being preferred because of their availability and compatibility with the reservoir. Any suitable salts, such as the halides, of the monovalent and divalent cations may be used to furnish the desired concentrations of cations. Such salts as the chlorides of sodium, potassium, calcium, and magnesium are readily available at most oilfield locations.

As noted previously, the first injected liquid must contain divalent cations in a concentration greater than that of the formation water. The divalent cation concentration of the resident formation water typically will be within the range of 0 to 0.5 percent by weight, although it sometimes may be as high as 1 or 2 percent. Accordingly, in carrying out the invention the initial aqueous liquid preferably will contain divalent cations in a concentration within the range of 0.5 to 5 percent by weight. The monovalent cation concentration of the formation water normally will be greater than 0.5 percent, although in reservoirs which have been subjected to fresh water influx or injection it may be substantially less. Thus, the monovalent cation concentration of the first liquid preferably is within the range of 0 to 0.5 percent. The subsequently injected buffer liquid, if employed, and the aqueous solution of ionic polysaccharide preferably will exhibit a monovalent cation concentration within the range of 0.5 to 2.5 percent by weight and a divalent cation concentration within the range of 0 to 0.5 percent by weight. In most cases, it will be desirable that the buffer liquid and aqueous solution of ionic polysaccharide be free of divalent cations in order to avoid the possibility of plugging at the injection well.

What I claim is:

1. In the recovery of oil from a subterranean oil reservoir exhibiting a base exchange capacity and penetrated by spaced injection and production systems defining a recovery zone of said reservoir, the method comprising:
   a. injecting into said reservoir via said injection system an aqueous liquid containing divalent cations in a concentration greater than the divalent ion concentration of formation water within said reservoir,
   b. introducing into said reservoir via said injection system an aqueous liquid of a divalent ion concentration lower than the divalent ion concentration of the liquid injected in step (a) and containing an ionic polysaccharide thickening agent which is subject to agglomeration in the presence of said divalent ions,
   c. introducing a driving fluid into said reservoir via said injection system, and
   d. recovering oil from said production system.

2. The method of claim 1 wherein the aqueous liquid of step (a) is introduced into said reservoir in an amount within the range of 5 to 10 percent of the pore volume of said recovery zone and the aqueous liquid of step (b) is introduced into said reservoir in an amount within the range of 1 to 20 percent of the pore volume of said recovery zone.

3. The method of claim 1 wherein said aqueous liquid injected in step (a) exhibits a monovalent cation concentration lower than the monovalent cation concentration of said formation water.

4. The method of claim 3 wherein the aqueous liquid injected in step (b) contains monovalent cations in a concentration greater than the monovalent cation concentration of the aqueous liquid injected in step (a).

5. The method of claim 1 further comprising intermediate steps (a) and (b) introducing into said reservoir via said injection system an aqueous buffer liquid of a divalent cation concentration lower than that of the liquid injected in step (a).

6. The method of claim 5 wherein said liquid injected in step (a) exhibits a monovalent cation concentration lower than the monovalent cation concentration of said formation water and said buffer liquid and liquid injected in step (b) exhibit higher monovalent cation concentrations than that of the liquid injected in step (a).

7. The method of claim 1 wherein said thickening agent is an ionic polysaccharide produced by fermentation of carbohydrates by bacteria of the genus Xanthomonas.

8. The method of claim 7 wherein said thickening agent is the ionic polysaccharide B-1459.

9. In the recovery of oil from a subterranean oil reservoir exhibiting a base exchange capacity and penetrated by spaced injection and production systems defining a recovery zone of said reservoir, the method comprising:
   a. injecting into said reservoir via said injection system an aqueous liquid containing divalent cations in a concentration within the range of 0.5 to 5 weight percent,
   b. introducing into said reservoir via said injection system an aqueous liquid of a divalent ion concentration lower than that of the liquid injected in step (a) and within the range of 0 to 0.5 weight percent and containing an ionic polysaccharide which is subject to agglomeration in the presence of said divalent ions,
   c. introducing a driving fluid into said reservoir via said injection system, and
   d. recovering oil from said production system.

10. The method of claim 9 wherein said thickening agent is an ionic polysaccharide produced by fermentation of carbohydrates by bacteria of the genus Xanthomonas.

11. The method of claim 10 wherein said thickening agent is the ionic polysaccharide B-1459.

12. The method of claim 11 wherein the liquid injected in step (a) exhibits a monovalent cation concentration within the range of 0 to 0.5 weight percent and the liquid injected in step (b) exhibits a higher monovalent cation concentration within the range of 0.5 to 2.5 weight percent.

13. The method of claim 12 further comprising intermediate steps (a) and (b) introducing into said reservoir via said injection system an aqueous buffer liquid of a divalent cation concentration lower than that of the liquid injected in step (a) and within the range of 0 to 0.5 percent by weight and of a monovalent cation concentration greater than that of the liquid injected in step (a) and within the range of 0.5 to 2.5 percent by weight.

14. The method of claim 13 wherein the liquid of step (a), the buffer liquid, and the liquid of step (b) are introduced into said reservoir in amounts within the ranges, respectively, of 5 to 10 percent, 0.001 to 0.1 percent, and 1 to 20 percent of the pore volume of said recovery zone.